United States Patent [19]

Aubie et al.

[11] Patent Number: 5,140,619
[45] Date of Patent: Aug. 18, 1992

[54] SYNCHRONIZATION DEVICE FOR A SEQUENCE OF VARIABLE LENGTH RASTERS

[75] Inventors: Jean-Yves Aubie; Claude Perron, both of Betton, France

[73] Assignee: Thomson CSF, Puteaux, France

[21] Appl. No.: 555,509

[22] PCT Filed: Dec. 3, 1989

[86] PCT No.: PCT/FR89/00635
§ 371 Date: Aug. 7, 1990
§ 102(e) Date: Aug. 7, 1990

[87] PCT Pub. No.: WO90/06643
PCT Pub. Date: Jun. 14, 1990

[30] Foreign Application Priority Data

Dec. 9, 1988 [FR] France .................. 88 16219

[51] Int. Cl.[5] ............................................. H04L 7/10
[52] U.S. Cl. ...................................... 375/116; 370/47;
370/105.4; 370/108
[58] Field of Search .............. 375/106, 113, 114, 116;
370/47, 85.1, 105, 105.1, 105.4; 358/108, 148

[56] References Cited

U.S. PATENT DOCUMENTS

| | | | |
|---|---|---|---|
| 3,823,266 | 7/1974 | Van Elk et al. | 375/108 |
| 4,277,843 | 7/1981 | Duquenne et al. | 370/105.1 |
| 4,344,180 | 8/1982 | Cummiskey | 375/116 |
| 4,773,065 | 9/1988 | Kobayashi et al. | 370/85.1 |
| 4,811,367 | 3/1989 | Tajika | 375/116 |

Primary Examiner—Benedict V. Safourek
Assistant Examiner—Young Tse
Attorney, Agent, or Firm—Cushman, Darby & Cushman

[57] ABSTRACT

Synchronization for a device receiving an input sequence of variable length rasters even in the presence of transmission errors. Each variable length raster is preceded by an N times identically repeated prefix, this prefix is composed of a fixed binary pattern separator and a parameter word describing the variable length raster to follow. Upon identifying a fixed binary pattern separator, even in the presence of transmission errors, the synchronization device outputs asynchronization signal signaling that a parameter word is to follow. The parameter word input is then subjected to transmission error elimination and output to the receiving device. Thus the receiving device is able to properly input the incoming variable length raster based on a accurate parameter word.

3 Claims, 2 Drawing Sheets

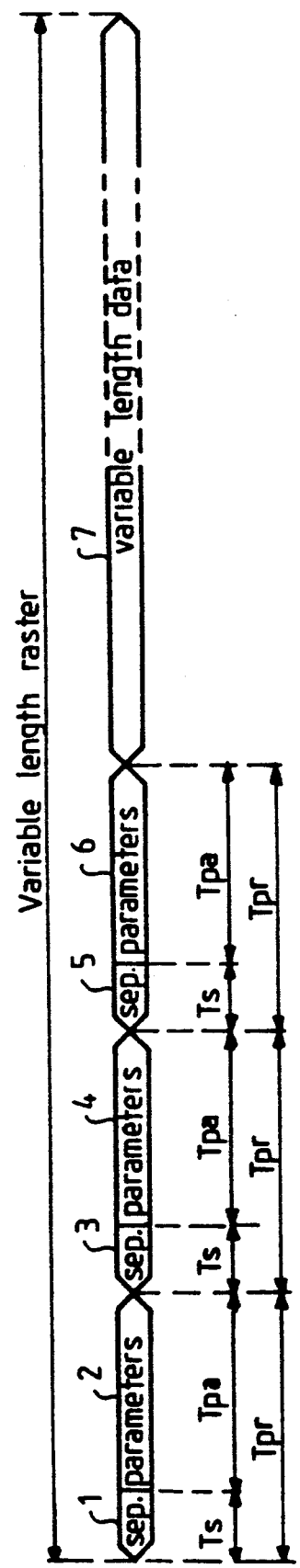
FIG_1

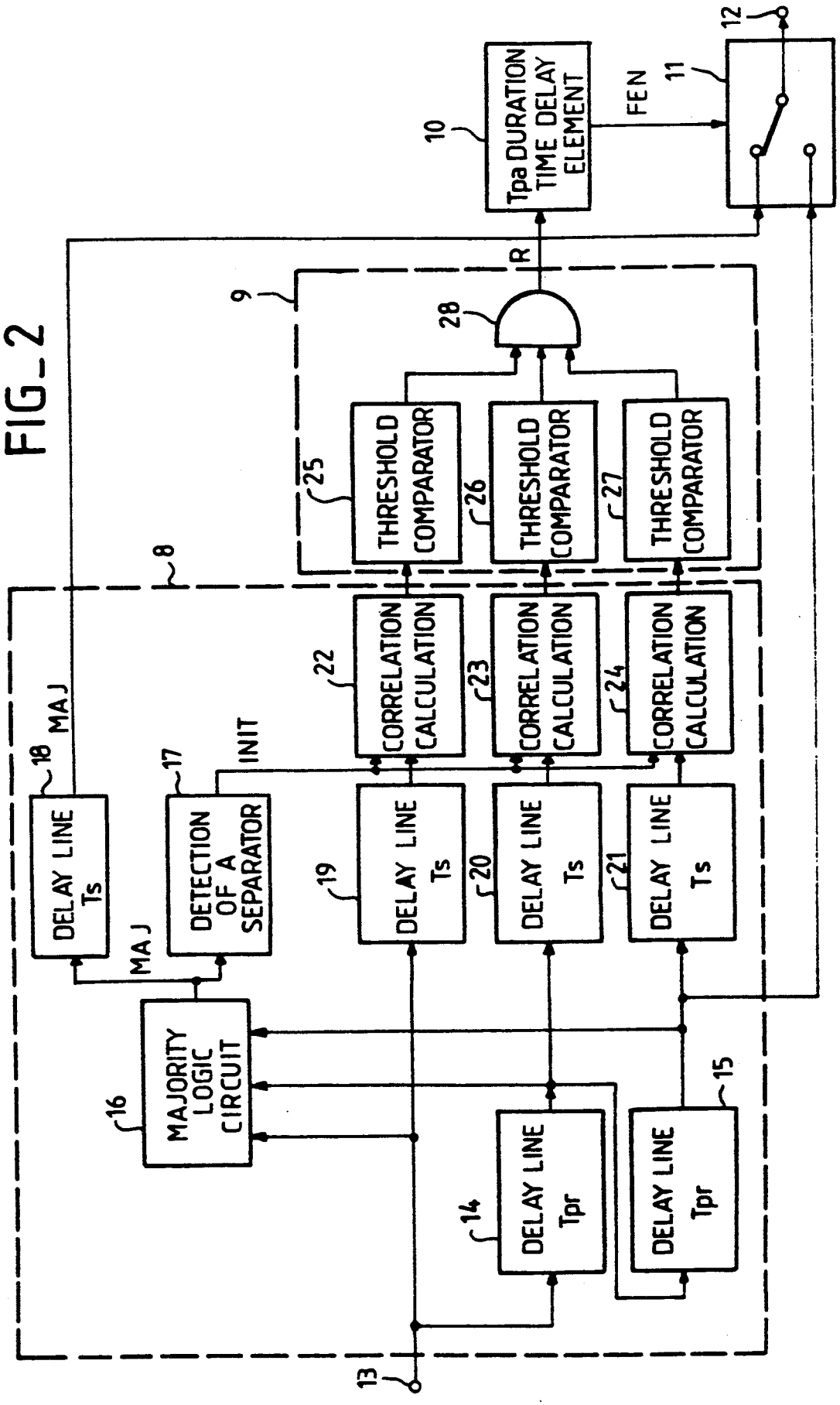
FIG_2

SYNCHRONIZATION DEVICE FOR A SEQUENCE OF VARIABLE LENGTH RASTERS

BACKGROUND OF THE INVENTION

The invention relates to a synchronization device for a sequence of variable length rasters. These rasters comprise variable length data preceded by a binary word having a fixed length and generally fulfilling two functions: to enable the synchronization of a device receiving the data in relation to a device transmitting the data, by separating the data belonging to distinct rasters; and to transmit parameters which are unique to the raster under consideration and which will enable use to be made of the data transmitted in this raster.

In order to protect the synchronization against transmission errors this binary word may be constituted from N identical words, referred to as prefixes, each comprising a word referred to as raster separator, constituted from a fixed pattern, and a word referred to as parameter word having a fixed length but a content unique to the raster which follows.

The aim of the invention is to propose a synchronization device enabling detection of the raster separators and extraction of the parameter words even in the presence of transmission errors. The subject of the invention is a synchronization device comprising correlation calculating means for detecting the separators even if they are all to some extent corrupted by transmission errors, and in order to deduce therefrom intervals of time during which the parameter words may be extracted from the sequence of rasters.

SUMMARY OF THE INVENTION

According to the invention, a synchronization device for a sequence of variable length rasters, each raster commencing by N separator words which are identical and separated by a constant interval, comprises:

means for calculating N correlation values, reflecting respectively the correlation between a sequence of bits which are identical to those of each separator and N sequences of binary data, constituted respectively by delaying the rasters for i times the interval of the separators, for $i = 0$ to $N-1$;

means for supplying a recognition signal when these N correlation values are all greater than a threshold value, this signal indicating that N separators are recognized.

BRIEF DESCRIPTION OF THE DRAWINGS

The invention will be better understood and other details will emerge with the aid of the following description and the accompanying figures, in which:

FIG. 1 shows the chronogram of an example of a variable length raster;

FIG. 2 shows the synoptic diagram of an example embodiment of a synchronization device according to the invention.

DESCRIPTION OF THE PREFERRED EMBODIMENT

The variable length raster shown in FIG. 1 comprises a three times identically repeated prefix, each prefix having a duration Tpr and comprises variable length data 7. The first prefix is constituted by a separator 1 and by a parameter word 2. The second prefix is constituted from a separator 3 and from a parameter word 4. The third prefix is constituted from a separator 5 and from a parameter word 6. Each separator 1, 3 and 5 comprises the same binary pattern and has an identical duration Ts. It enables recognition of the boundary between two successive rasters. Each parameter word 2, 4 and 6 comprises the same number of bits and has an identical duration Tpa but has a content which is unique to the raster under consideration. The three prefixes of a given raster comprise three parameter words which are identical.

The synchronization of a decoding device requires recognition of the separators 1, 3 and 5 in spite of transmission errors and determination of their position so as to know when the data 7 commence. On the other hand, the decoding of the data 7 requires perfectly exact knowledge of the parameters obtained by the three parameter words 2, 4 and 6.

FIG. 2 shows the synoptic diagram of an example embodiment of the synchronization device according to the invention, for the synchronization of a decoder receiving variable length rasters such as those shown in FIG. 1. This example comprises: an input terminal 13 receiving the sequence of variable length rasters; a calculating device 8 for calculating three correlation values; a logic circuit 9 for supplying a recognition signal R when the three correlation values are all greater than a specified threshold value, this signal R indicating that three separators which precede a raster are recognized; a digital time delay element 10 having a time delay of duration Tpa; a two input and one output switch 11; and an output terminal 12 which is connected, in this example, to a buffer memory which is not shown. The output terminal 12 supplies both the data 7 contained in each raster, and the content of the parameter words 2, 4 and 6 which are extracted from the three prefixes situated at the start of each raster.

The calculating device 8 comprises: two digital delay lines 14 and 15, each engendering a delay equal to the duration Tpr of a prefix; four digital delay lines 18 to 21, each engendering a delay equal to the duration Ts of a separator; a device 17 for detecting a separator; and three correlation calculating devices 22 to 24.

The calculating device 8 possesses an input connected to the input terminal 13, this input being connected: to an input of the circuit 16, to an input of the delay line 19, and to an input of the delay line 14. An output of the delay line 14 is connected to an input of the circuit 16; to an input of the delay line 15; and to an input of the delay line 20. An output of the delay line 15 is connected to an input of the circuit 16; to an input of the delay line 21; and to a first input of the switch 11. The function of the delay lines 14 and 15 is to supply the sequence of the rasters with a delay Tpr and 2 Tpr respectively.

Thus the three inputs of the circuit 16 respectively receive three sequences of rasters which are shifted in time in such a way that the first input receives the i'th bit of the third prefix at the same moment that the second input receives the i'th bit of the second prefix and the third input receives the i'th bit of the first prefix. The circuit 16 is a majority logic circuit supplying a binary signal, denoted MAJ. The value MAJ is equal to the majority bit from the three ith bits respectively applied to the three inputs. Similarly, the inputs of the delay lines 19 to 21 respectively receive, at the same instant, the i'th bit of the third prefix, the i'th bit of the second prefix, and the i'th bit of the first prefix.

An output of the circuit 16 is connected to an input of the delay line 18 and to an input of the device 17 for detecting a separator. This device 17 supplies a logic signal INIT when it detects, in the sequence of the majority binary values, a pattern identical to the expected separators. The output of the detector 17 is connected to inputs for initialization of the calculating devices 22 to 24. The latter possess inputs respectively connected to the outputs of the delay lines 19 to 21. The signal INIT initializes a correlation calculation in each of the devices 22 to 24 at the instant when the detection device 17 finishes recognition of a separator. In order to compensate to the time required by the device 17 for recognize a separator, the delay lines 19 to 21 delay, by a duration Ts, the binary sequences which are applied respectively to the inputs of the correlation calculating devices, 22 to 24.

Each of the calculating devices 22 to 24 calculates a correlation value which is equal to the number of bits which are identical in the sequence of binary values which is applied to the input of the calculating device and in a sequence of binary values are equal to the bits constituting a separator. By virtue of the device 17 for detecting a separator, the calculation commences precisely at the instant when the device 22 commences receiving the separator 5, the device 23 commences receiving the separator 3 and the device 24 commences receiving the separator 1. After an interval of time of duration Ts, the calculating devices 22 to 24 supply three correlation values which are all the smaller as there are more erroneous bits in the separator 5, in the separator 3 and in the separator 1 respectively. Three outputs of the calculating devices 22 to 24 constitute three first outputs of the calculating device 8 and are connected to three inputs of the calculating device 9.

The calculating device 9 comprises: three threshold comparators 25 to 27, having a same specified threshold value; and an AND logic gate 28. The three inputs of the device 9 are constituted respectively by three inputs of the threshold comparators 25 to 27. Three outputs of these comparators are connected respectively to three inputs of the gate 28. The output of gate 28 constitutes an output of the device 9, which device is connected to an input for controlling the time delay element 10. The threshold of the comparators 25 to 27 corresponds to a certain proportion of errors on each of the separators 1, 3 and 5. For example, if each separator comprises 41 bits, a threshold value equal to 38 enables each separator comprising 38 exact bits and 3 erroneous bits to be considered as valid. When the three correlation values are greater than the threshold value, the comparators 25 to 27 supply three signals which validate the AND gate 28. The output of the gate 28 then supplies a recognition logic signal R indicating that three separators are recognized. This synchronization device therefore enables recognition of the separators of variable length rasters even if these separators each comprise several erroneous bits.

A second function of this synchronization device is to extract, with the greatest possible exactness, the parameters unique to the data 7, with a view to being able to correctly decode these data. Like the separators 1, 3 and 5, the parameter words 2, 4 and 6 are corrupted by binary errors. The majority logic circuit 16 enables elimination of these errors if there is only one erroneous value out of the three values of a single bit of the parament word. When there are no transmission errors, the circuit 16 supplies the exact prefix three times. This is no longer the case in the presence of transmission errors. In fact, while the second prefix is arriving at the input terminal 13, the circuit 16 receives respectively on the three inputs: the second prefix, the first prefix and any sequence whatsoever constituted by data from the preceding variable length raster. The least error on one bit of the first or second prefix therefore provokes an error in the prefix restored in the circuit 16.

Similarly, following the arrival of the third prefix on the input band 13, the delay lines 14 and 15 restore respectively the second and the first prefix. Consequently, the circuit 16 receives respectively on its three inputs: the first prefix, the second prefix, and the third prefix. The only case where the circuit 16 takes advantage of the redundancy of the three prefixes is therefore the case when it receives simultaneously on its three inputs: the first, the second and the third prefix. In this case, the output of the circuit 16 restores a prefix in which the transmission errors are corrected by the majority decision, so far as is possible.

The device according to the invention comprises a switch 11 for extracting from the majority binary sequence MAJ, supplied by the circuit 16, only the bits situated in an interval of time when the circuit 16 supplies a prefix possessing the best exactness. For this purpose, the binary sequence MAJ is applied to a second input of the switch 11 by way of the delay line 18 engendering a delay Ts compensating for the delay due to the operation of the device 17. An output of the switch 11 is connected to the output terminal 12 of the device. An input for controlling the switch 11 is connected to an output of the time delay element 10. An input for controlling the time delay element 10 is connected to the output of the device 9 in order to receive the recognition signal R.

When the time delay element 10 receives the signal R then a switching of the switch 11, by a window logic signal WIN occurs, the duration of which is equal to the duration Tpa of a parameter word. For this duration the switch 11 therefore transmits the MAJ binary sequence which represents the parameter word. Except during the WIN signal duration, the switch 11 outputs the sequence of the delayed binary data which is supplied by the output of the delay line 15, these binary data not being able to be adjusted by a majority logic since they do not comprise any redundancies.

The device 17 for detecting a separator and the devices 22 to 24 for correlation calculation may be constructed in various ways, which vary, in particular, depending on the type of pattern used to constitute the separators. For example, if each separator is constituted from 40 bits of values 0 and 1, it is possible to construct the device 17 and each correlation calculating device 22 to 24 by means of a counter which counts the number of zeros in the binary sequence. The construction of these devices for other separator patterns is within the scope of those skilled in the art.

The invention is applicable, in particular, to the field of the encoding and decoding of television pictures, in order to ensure the synchronization of a decoder.

We claim:

1. Synchronization device for an input sequence of variable length rasters, each raster preceded by an N times identically repeated prefix having a duration Tpr, the prefix composed of a fixed binary pattern separator of duration Ts and a parameter word of duration Tpa, the synchronization device comprising:

calculation means for simultaneously calculating N correlation values between the fixed binary pattern separator and binary values selected from the input sequence, the calculation means comprising:
  delay means for receiving the input sequence of variable length rasters and splitting the input sequence into N−1 time delayed sequences, each time delayed sequence being time delayed by i Tpr from the input sequence, where i=1 to n−1;
  initialization means for outputting an initialization signal upon detecting the fixed binary pattern separator of a variable length raster based on the input sequence and the N−1 time delayed sequences; and
  correlation means for simultaneously calculating N correlation values upon receipt of the initialization signal, said N correlation values representing the correlation between the binary values in the input sequence and the N−1 time delayed sequences and the fixed binary pattern separator; and
logic means for outputting a synchronization recognition signal upon identifying a fixed binary pattern separator based on said N correlation values, the logic means comprising:

threshold comparison means for comparing each of the N correlation values to a specified threshold value;
  synchronization recognition signal output means for outputting a synchronization recognition signal when each of the N correlation values are simultaneously greater than the specified threshold value.

2. Synchronization device according to claim 1, wherein the initialization means comprises:
  majority logic means for making a parallel bit by bit comparison of the input sequence and the N−1 time delayed sequences and outputting a majority bit sequence;
  detecting means for receiving the majority bit sequence and outputting the initialization signal when the fixed binary pattern of the fixed binary pattern separator is detected in the majority bit sequence.

3. Synchronization device according to claim 2, further comprising:
  window signal means for receiving the synchronization recognition signal and outputting a window signal of duration Tpa upon receipt thereof; and
  output control means for inputting the window signal, and the majority bit sequence, and outputting the majority bit sequence only during the duration of the window signal.

* * * * *